(12) United States Patent
Haley

(10) Patent No.: US 7,225,579 B2
(45) Date of Patent: Jun. 5, 2007

(54) WING STRUCTURE FOR A WATERFOWL DECOY

(76) Inventor: Patrick Haley, 173 S. Fairfax, Denver, CO (US) 80246

( * ) Notice: Subject to any disclaimer, the term of this patent is extended or adjusted under 35 U.S.C. 154(b) by 8 days.

(21) Appl. No.: 11/222,713

(22) Filed: Sep. 8, 2005

(65) Prior Publication Data

US 2007/0051030 A1 Mar. 8, 2007

(51) Int. Cl.
*A01M 31/06* (2006.01)
(52) U.S. Cl. .............................................. 43/3
(58) Field of Classification Search .................. 43/2, 43/3

See application file for complete search history.

(56) References Cited

U.S. PATENT DOCUMENTS

| | | | | |
|---|---|---|---|---|
| 74,458 A | * | 2/1868 | Wales | 43/3 |
| 378,410 A | * | 2/1888 | Trimble | 43/3 |
| 407,142 A | * | 7/1889 | Wobito | 43/2 |
| 547,553 A | * | 10/1895 | Keller | 43/3 |
| 740,293 A | * | 9/1903 | Loeble | 43/3 |
| 1,831,286 A | * | 11/1931 | Chelini | 43/3 |
| 2,174,211 A | * | 9/1939 | Hutaff, Jr. | 43/3 |
| 2,413,418 A | * | 12/1946 | Rulison | 43/3 |
| 2,480,390 A | * | 8/1949 | Thompson | 43/3 |
| 2,663,108 A | * | 12/1953 | Dixon et al. | 43/3 |
| 2,691,233 A | * | 10/1954 | Richardson | 43/3 |
| 2,752,715 A | * | 7/1956 | Miller | 43/3 |
| 2,787,074 A | * | 4/1957 | Miller | 43/3 |
| 2,849,823 A | * | 9/1958 | Miller | 43/3 |
| 3,059,368 A | * | 10/1962 | Wortman | 43/3 |
| 3,435,550 A | * | 4/1969 | Carlson | 43/3 |
| 3,537,205 A | * | 11/1970 | Robert | 43/3 |
| 4,128,958 A | * | 12/1978 | Snow | 43/3 |
| 4,896,448 A | * | 1/1990 | Jackson | 43/3 |
| 4,965,953 A | * | 10/1990 | McKinney | 43/2 |
| 5,036,614 A | * | 8/1991 | Jackson | 43/3 |
| 5,144,764 A | * | 9/1992 | Peterson | 43/3 |
| 5,231,780 A | * | 8/1993 | Gazalski | 43/3 |
| 5,375,363 A | * | 12/1994 | Higdon | 43/3 |
| 5,636,466 A | * | 6/1997 | Davis | 43/3 |
| 5,960,577 A | * | 10/1999 | Walterson | 43/3 |
| 6,289,626 B1 | * | 9/2001 | Williams | 43/2 |
| 6,293,042 B1 | * | 9/2001 | Arvanitis et al. | 43/3 |
| 6,339,893 B1 | | 1/2002 | Solomon | 43/3 |
| 6,349,902 B1 | * | 2/2002 | Cripe | 43/3 |
| 6,360,474 B1 | * | 3/2002 | Wurlitzer | 43/3 |
| 6,460,284 B1 | | 10/2002 | Rabo | 43/3 |
| 6,508,028 B1 | | 1/2003 | Crowe | 43/3 |
| 6,574,903 B2 | * | 6/2003 | Solomon | 43/3 |
| 6,665,975 B2 | * | 12/2003 | Porter | 43/3 |

(Continued)

FOREIGN PATENT DOCUMENTS

| | | | |
|---|---|---|---|
| EP | 1179296 A2 | * | 2/2001 |
| EP | 1279333 A2 | * | 1/2003 |
| FR | 2873265 A1 | * | 1/2006 |
| GB | 2067064 A | * | 7/1981 |
| GB | 2124464 A | * | 2/1984 |
| GB | 2295953 A | * | 6/1996 |
| WO | WO-03/059058 A1 | * | 7/2003 |

*Primary Examiner*—Darren W. Ark
(74) *Attorney, Agent, or Firm*—Swanson & Bratschun, L.L.C.

(57) ABSTRACT

A wing structure for a waterfowl decoy including a base, a proximal wing member, and a distal wing member. The wing structure features a shoulder connection between the base and the proximal wing member, allowing the proximal wing member to move with respect to the base. The wing structure also features a wrist connection between the proximal wing member and the distal wing member, allowing the distal wing member to move with respect to the proximal wing member.

8 Claims, 8 Drawing Sheets

U.S. PATENT DOCUMENTS

| | | | |
|---|---|---|---|
| 6,698,132 B1 * | 3/2004 | Brint | 43/3 |
| 6,715,228 B1 * | 4/2004 | Price | 43/3 |
| 6,843,702 B2 * | 1/2005 | Weiser | 43/3 |
| 7,033,240 B2 * | 4/2006 | Weiser | 43/3 |
| 2001/0001913 A1 | 5/2001 | Mathews | 43/3 |
| 2002/0017047 A1 * | 2/2002 | Mierau | 43/3 |
| 2002/0162268 A1 * | 11/2002 | Fulcher | 43/3 |
| 2003/0110676 A1 | 6/2003 | Mathews | 43/3 |
| 2004/0025400 A1 * | 2/2004 | Salato | 43/3 |
| 2004/0211106 A1 | 10/2004 | Solomon | 43/3 |

* cited by examiner

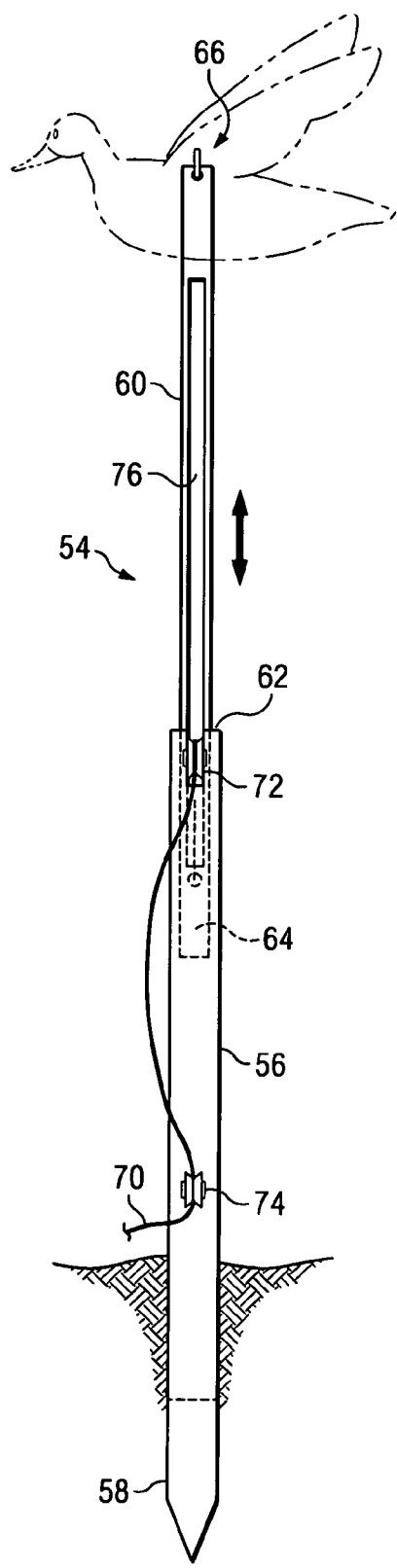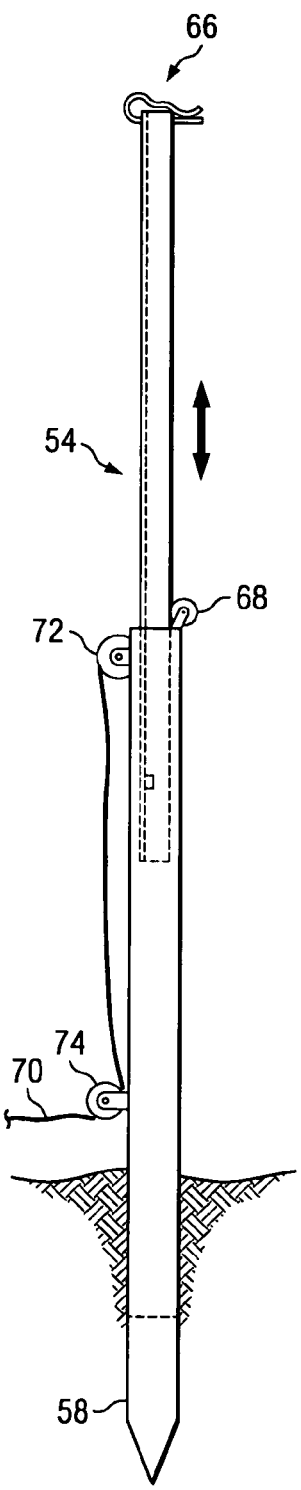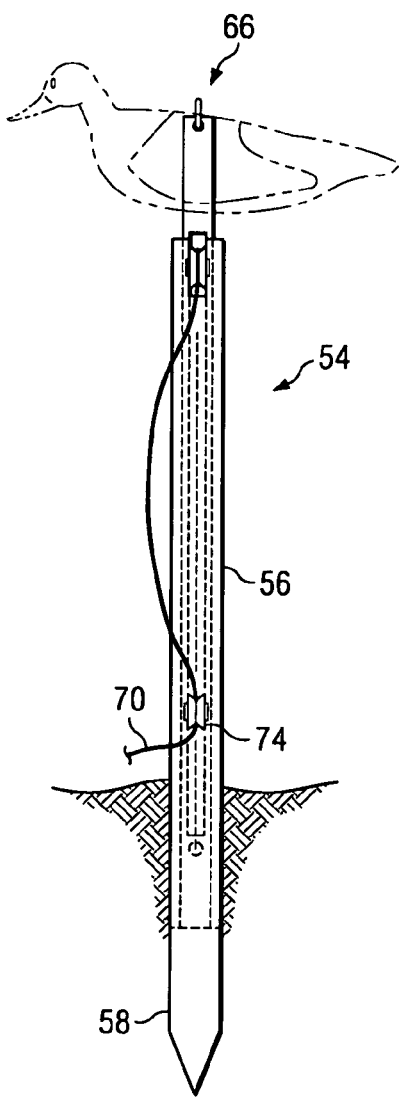
*FIG. 9*  *FIG. 10*  *FIG. 11*

WING STRUCTURE FOR A WATERFOWL DECOY

TECHNICAL FIELD

The present invention is directed toward a wing structure for a waterfowl decoy, and more particularly toward a wing structure which provides for natural flapping and folding decoy wing motions.

BACKGROUND ART

Waterfowl decoys are used by hunters or photographers to attract waterfowl to desired areas. Typically, the user of waterfowl decoys will arrange a grouping of decoys on the surface of a pond or other body of water, or arrange decoys in the meadows, fields, or swampy areas adjacent to a body of water. The hunter or photographer setting the decoys strongly desires to mimic the appearance of a natural waterfowl flock. Live waterfowl are hopefully attracted to the pond or field upon which the decoys are set through association of the presence of the decoys with a safe and suitable habitat. Waterfowl have keen eyesight. Therefore, it is critical that the deployed decoys accurately mimic live waterfowl. Otherwise, the effectiveness of the decoys will be compromised.

Typical prior art decoys mimic waterfowl at rest. Wings or wing-like structures, if present at all, are merely painted or molded in a folded and retracted position against the waterfowl decoy body. Certain types of waterfowl are particularly sensitive to an unnatural arrangement of decoys on the surface of a pond or field. Geese in particular will often notice that all of the decoys have their wings folded and that none are flapping their wings in preparation for a takeoff or landing. This presentation is quite unnatural and can cause geese to shy away from a pond or meadow since at least a few members of a wild goose flock on the ground will be stretching, flapping, or otherwise moving their wings at a point in time. Hunters have long recognized that one or two decoys which feature a flapping wing mechanism can aid in luring a wary goose flock.

Accordingly, various designs have been developed for decoys which mimic wing flapping behavior. Many of the prior art designs are simple structures where kite-like wings merely flap or spin in the breeze. Somewhat more sophisticated designs feature an articulated joint at the decoy shoulder which allows wings to flap up and down. Natural waterfowl such as geese, however, engage in several more sophisticated wing motions, none of which is particularly well mimicked by a simple kite-like wing structure. For example, a goose in flight will flap its wings up and down with respect to the body at the shoulder joint with minimal flexure at its elbow and wrist joints. When a goose lands, however, the wings are flapped fully down at the shoulder joint and the wingtips are folded against the body at the wrist joint, presenting the typical, streamlined waterfowl profile. Furthermore, when a goose is landing, it first flaps its wings while in the air above the ground, then more or less simultaneously descends to the ground while folding its wings. All of these types of wing motion must be matched to effectively mimic a natural waterfowl with a flapping wing decoy.

Sophisticated wing motion such as described above could potentially be reproduced using robotics and electromechanical componentry. Such a sophisticated, robotic implementation, however, would be quite expensive and subject to failure in the sometimes harsh climate of a marsh environment during hunting season. A need exists for a relatively simple mechanical device which can be simply actuated by a hunter or photographer in a blind, and which provides for the sophisticated mimicking of various natural waterfowl wing motions. The present invention is directed toward overcoming one ore more of the problems discussed above.

SUMMARY OF THE INVENTION

One aspect of the present invention is a wing structure for a waterfowl decoy including a base, a proximal wing member, and a distal wing member. The wing structure features a shoulder connection between the base and the proximal wing member, allowing the proximal wing member to move with respect to the base. The wing structure also features a wrist connection between the proximal wing member and the distal wing member, allowing the distal wing member to move with respect to the proximal wing member.

The shoulder connection of the wing structure may be a hinge. Similarly, the wrist connection may be a pivot. A shoulder spring may be included and configured to bias the proximal wing member away from the base. Similarly, a wrist spring may be included and configured to bias the portion of the distal wing member positioned substantially opposite the wrist connection, away from the proximal wing member.

This embodiment of the wing structure may further include an actuation cable configured to move the proximal wing member toward the base upon application of tension to the actuation cable. The actuation cable may further be configured to move the portion of the distal wing member positioned substantially opposite the wrist connection, toward the proximal wing member upon application of tension to the actuation cable. Preferably, the wing structure is configured such that application of tension to the actuation cable first moves the proximal wing member toward the base and then moves the portion of the distal wing member which is substantially opposite the wrist connection toward the proximal wing member upon the application of additional tension to the actuation cable.

The wing structure may further include a decoy body operatively associated with the base. A natural looking wing covering supported by the proximal and distal wing members may also be included.

Another aspect of the present invention is a waterfowl decoy including a decoy body and a wing structure as described above. Preferably, the waterfowl decoy and associated wing structure will feature first and second proximal and distal wing members with first and second connections therebetween. Thus, a natural waterfowl with two wings may be effectively mimicked. In a two winged embodiment, the waterfowl decoy may further include a master cable operatively associated with both a first and second actuation cable such that tension applied to the master cable will be transmitted to both the first and second actuation cables causing both wings to flap and fold as described above.

An alternative embodiment of the waterfowl decoy described above may further include a mounting pole, supporting the decoy body above ground level. A mechanism may be included with the mounting pole, and an elevation cable may be associated with the decoy body, providing for the height of the decoy body above the ground to be modified or varied by application of tension to the elevation cable.

Another aspect of the present invention is a method of attracting waterfowl. The method includes placing a decoy having a body and at least one proximal wing member and at least one distal wing member which are movable with respect to the body in a suitable location. In addition, the method includes applying tension to an actuation cable associated with the decoy, thereby causing the proximal wing member to flap with respect to the decoy body. The method also includes applying tension to the actuation cable, causing the proximal wing member to fold against the decoy body. The method may further include applying tension to the actuation cable to cause a portion of the distal wing member, which is substantially opposite the proximal wing member, to fold toward the proximal wing member. The method may be implemented with a waterfowl decoy having one or two proximal wing members and one or two distal wing members. Furthermore, the method may include movably engaging the decoy with a vertical mounting pole and changing the elevation of the decoy with respect to the ground while causing the proximal wing member to flap with respect to the decoy body. In addition, the method may include lowering the elevation of the decoy toward ground level, along with causing the proximal wing member to fold against the decoy body, and causing a portion of the distal wing member positioned substantially opposite the proximal wing member, to fold toward the proximal wing member, thus effectively mimicking a waterfowl with its wings folded at rest.

BRIEF DESCRIPTION OF THE DRAWINGS

FIG. 9 is a front plan view of a telescoping support pole consistent with the present invention;

FIG. 10 is a side plan view of a telescoping support pole consistent with the present invention; and FIG. 11 is a side plan view of a telescoping support pole consistent with the present invention.

DETAILED DESCRIPTION OF THE PREFERRED EMBODIMENT

Figure 1:
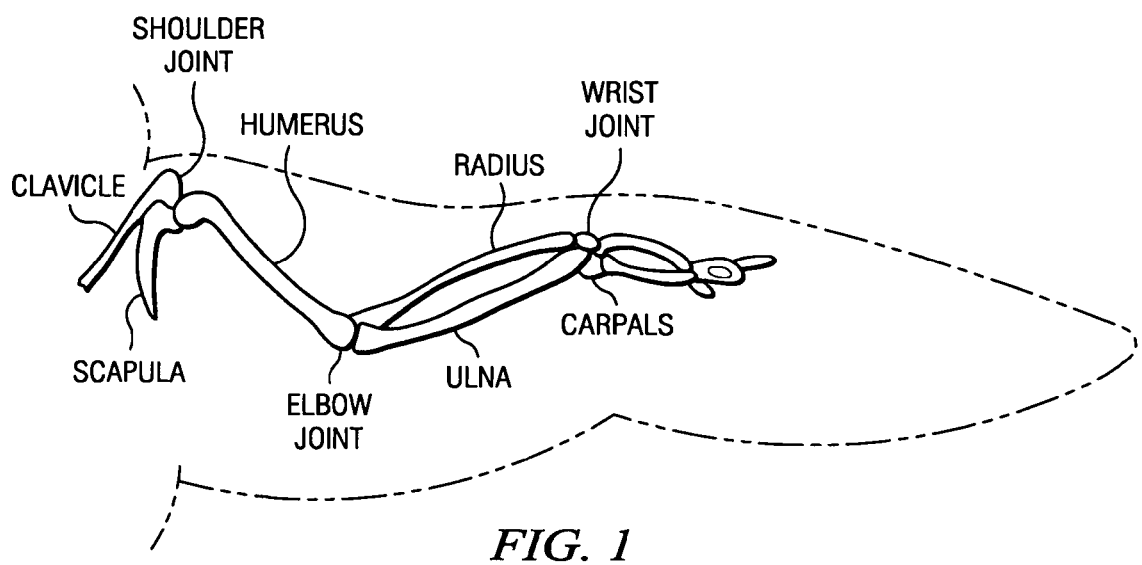
FIG. 1 is a schematic diagram of a natural waterfowl wing.

The gross skeletal structure of a natural waterfowl wing is similar to the forearm or foreleg skeletal structure of a nonwinged vertebrate. In particular, as is shown in FIG. 1, a generalized bird wing features a shoulder joint where the bird humerus articulates against and is supported by a clavicle and scapula. In addition, the generalized bird wing of FIG. 1 shows an elbow joint between the distal end of the humerus and radius and ulna bones. Finally, as is the case with flightless vertebrates, the distal end of the radius and ulna bones forms an articulated wrist joint with numerous carpals.

During flight, a bird flaps its wing up and down with articulation occurring primarily at the shoulder joint. Throughout a wing beat downstroke, only limited motion occurs at a waterfowl elbow or wrist joint. Some flexing occurs at the wrist joint during the recovery stroke, which is the wing beat upstroke. At rest, a waterfowl will fully articulate its shoulder joint to bring the portion of the wing supported by the humerus against the body. In addition, the wrist joint will also be fully flexed to fold and tuck the wingtips against the body, resulting in the smoothly streamlined body profile observed when a waterfowl is at rest or swimming. Accordingly, an artificial decoy wing must be able to naturally accomplish motion at both a shoulder joint and a wrist joint to successfully mimic a natural waterfowl. In particular, an articulated decoy wing must be able to both flap extended wings in a natural fashion and fold the wingtips appropriately against the decoy body to mimic a bird at rest.

Figure 2:
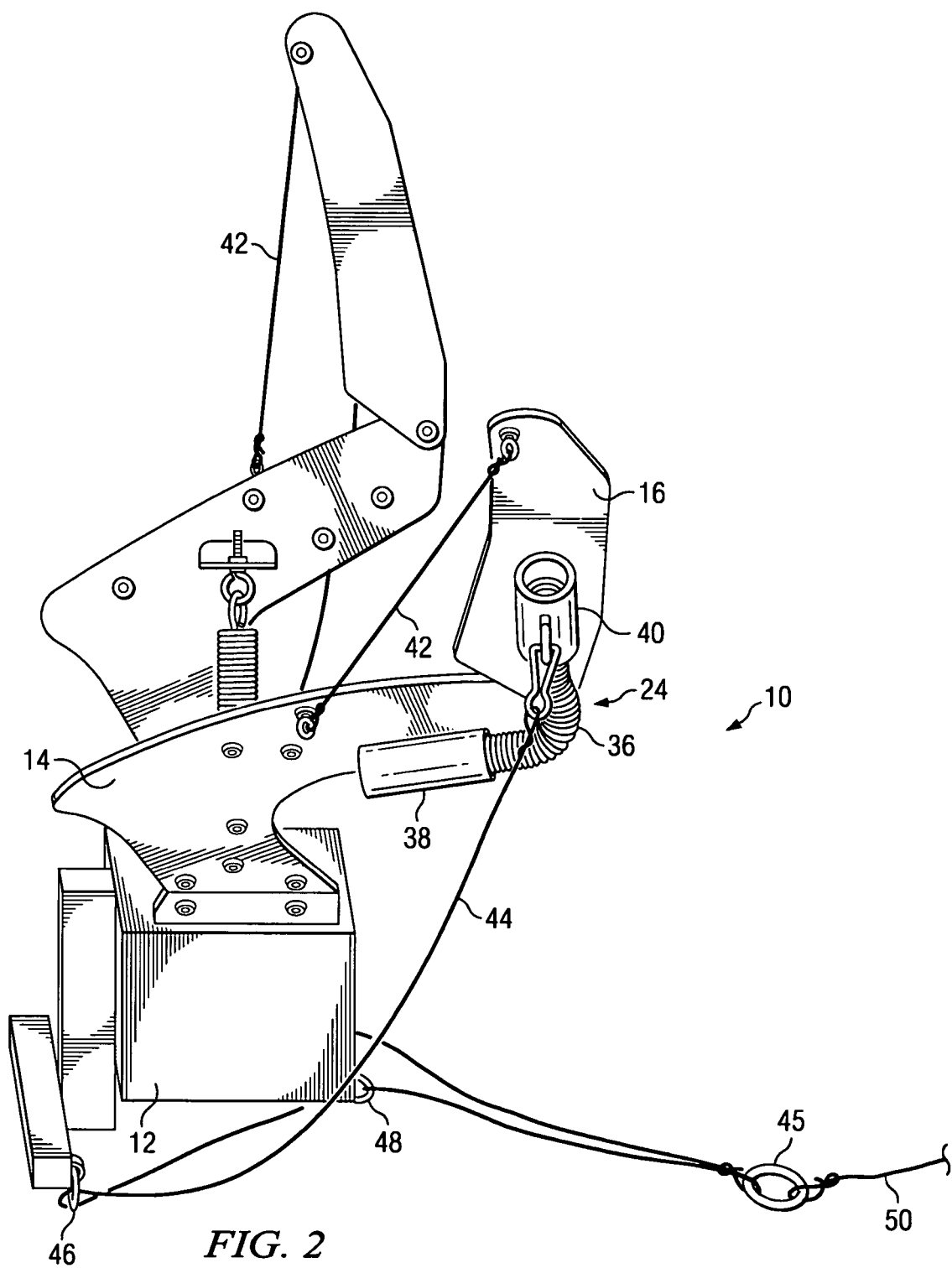
FIG. 2 is a side perspective view of a wing structure consistent with the present invention showing the position of wing elements at the beginning of a simulated downstroke.
Figure 3:
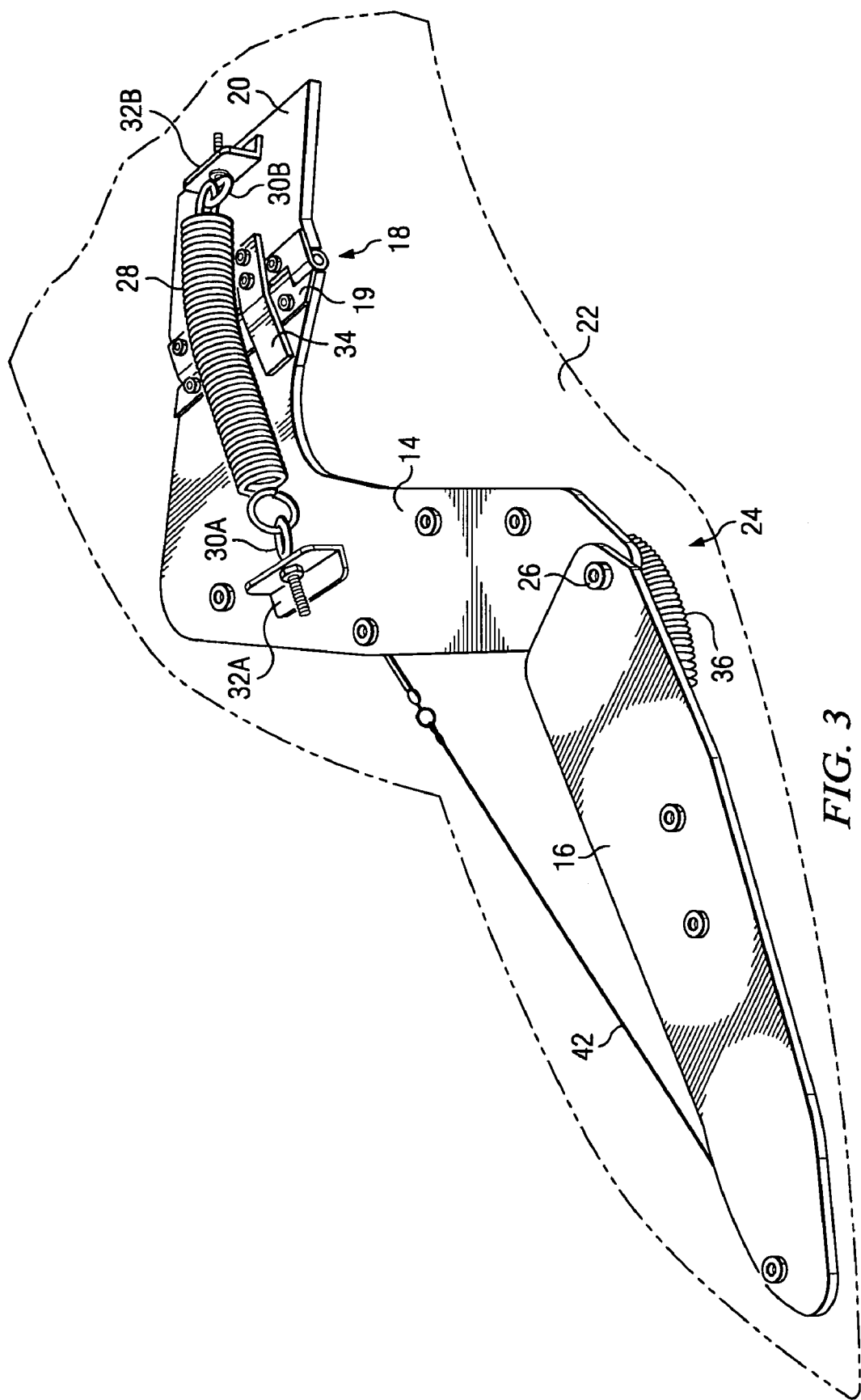
FIG. 3 is a perspective view of a proximal wing member and distal wing member consistent with the present invention.
Figure 7:
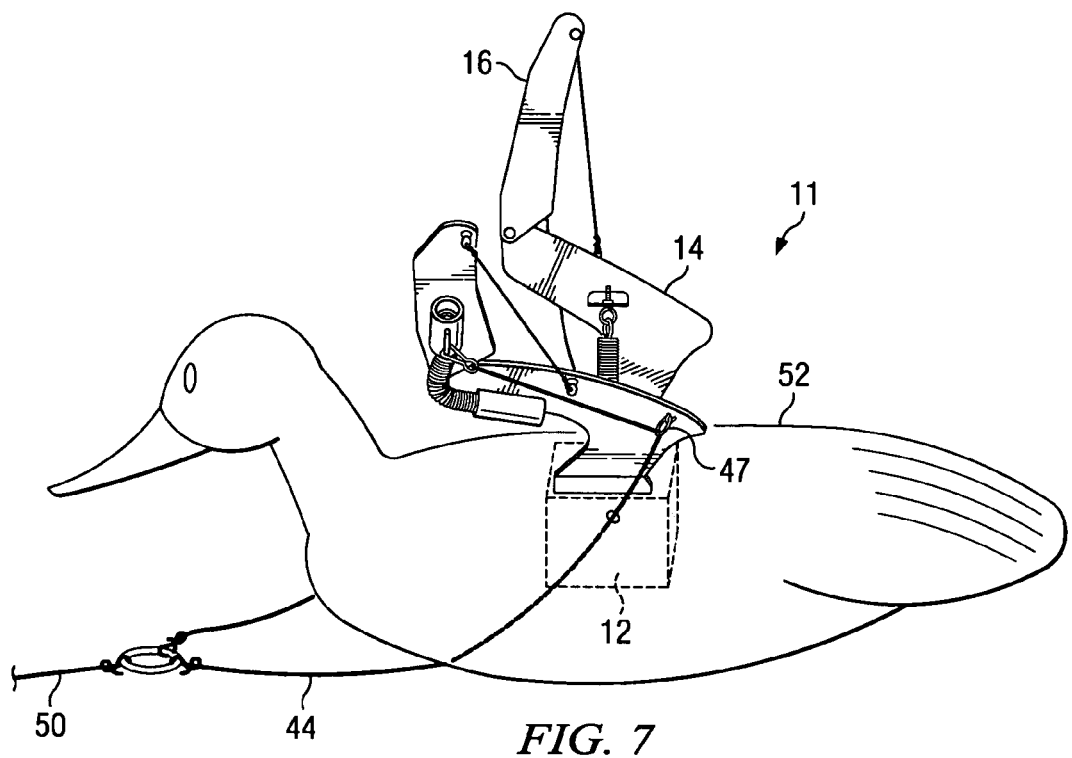
FIG. 7 is a perspective view of the wing structure of FIG. 2 associated with a decoy body.
Figure 8:
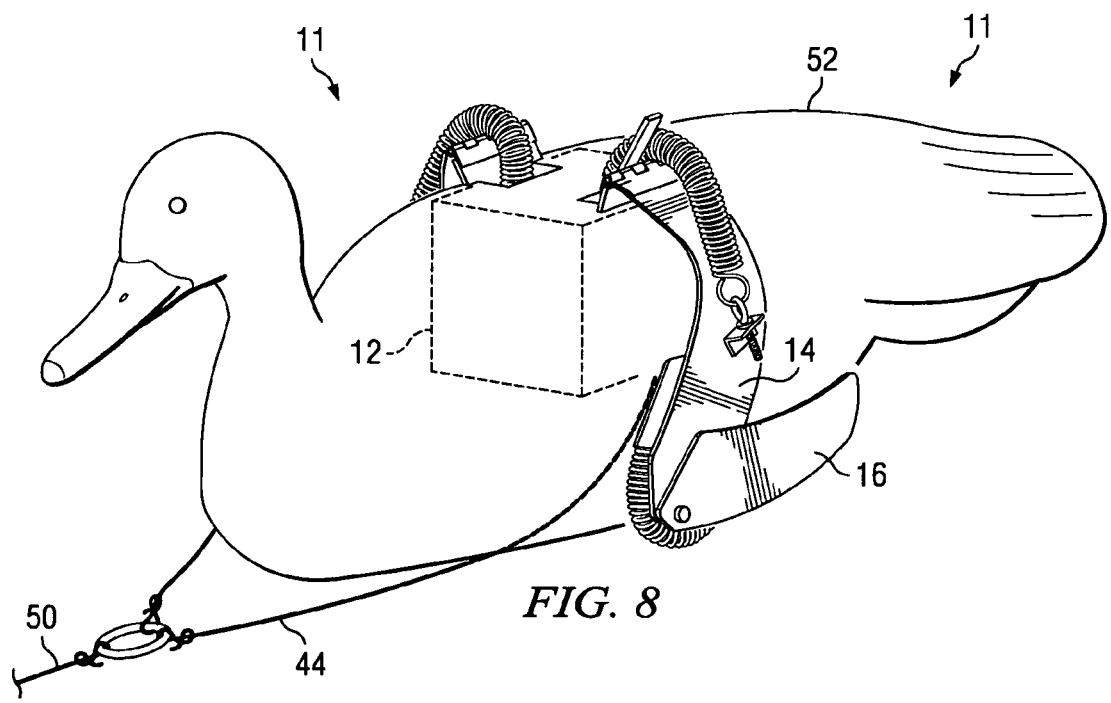
FIG. 8 is a perspective view of the wing structure of FIG. 6 associated with a decoy body.

FIG. 2 shows a wing structure 10 which provides for natural wing flapping and folding motions when associated with a waterfowl decoy 11 (see FIGS. 7–8). The wing structure 10 includes a base 12, a proximal wing member 14, and a distal wing member 16. The wing structure 10 also includes a shoulder connection 18 (best seen in FIG. 3) which is analogous to the shoulder joint of a bird. The shoulder connection 18 of the wing structure 10 is operatively positioned between the base 12 and the proximal wing member 14, and provides for the proximal wing member 14 to move in a flapping motion with respect to the base 12. As is best shown in FIG. 3, the shoulder connection 18 may be a hinge 19 between the proximal wing member 14 and an attachment plate 20 which is received in or attached to the base 12. Alternatively, the shoulder connection 18 may be a hinge 19 or other type of articulated joint directly between the proximal wing member 14 and the base 12, eliminating the need for an attachment plate 20.

Both the proximal wing member 14 and the distal wing member 16 are shown as platelike support structures in FIGS. 2–6. However, as described in detail below, the proximal wing member 14 and distal wing member 16 may be a support for portions of an artificial wing, fully formed wing portion replicas, or supports for a natural wing or a wing covering 22. Thus, the proximal wing member 14 and distal wing member 16 may be fabricated as simple rods, slats, or other suitably shaped support structures for a wing covering 22 or an artificial or natural wing. Alternatively, the proximal wing member 14 and distal wing member 16 may be fully formed artificial wing members having no supplemental support.

The wing structure 10 also includes a wrist connection 24 between the proximal wing member 14 and the distal wing member 16. The wrist connection 24 allows the distal wing member 16 to move with respect to the proximal wing member 14. As shown in detail in FIG. 3, the wrist connection 24 may be any suitable joint or movable connection between the proximal wing member 14 and distal wing member 16. For example, the wrist connection 24 may be implemented with a simple pivot 26 which extends transversely through both the proximal wing member 14 and distal wing member 16.

The wing structure 10 of the present invention provides for realistic decoy wing flapping motion where both the proximal wing member 14 and the distal wing member 16 may be moved in a simulated downstroke and recovery stroke, with articulation occurring as it does in a natural bird wing at the shoulder connection 18. Similarly, the wing structure 10 provides for the realistic folding of a simulated wingtip against a decoy body by articulation of both the shoulder connection 18 and wrist connection 24. These motions are described in more detail below.

A typical implementation of the wing structure 10 as described above will feature left and right proximal supports 14, left and right distal supports 16, and left and right shoulder and wrist connections 18, 24, respectively. Thus, both the left and right wings of a natural waterfowl would be effectively mimicked. However, the present invention may be implemented with only a single proximal wing member 14, distal wing member 16, shoulder connection 18, and wrist connection 24 if desired.

Figure 4:
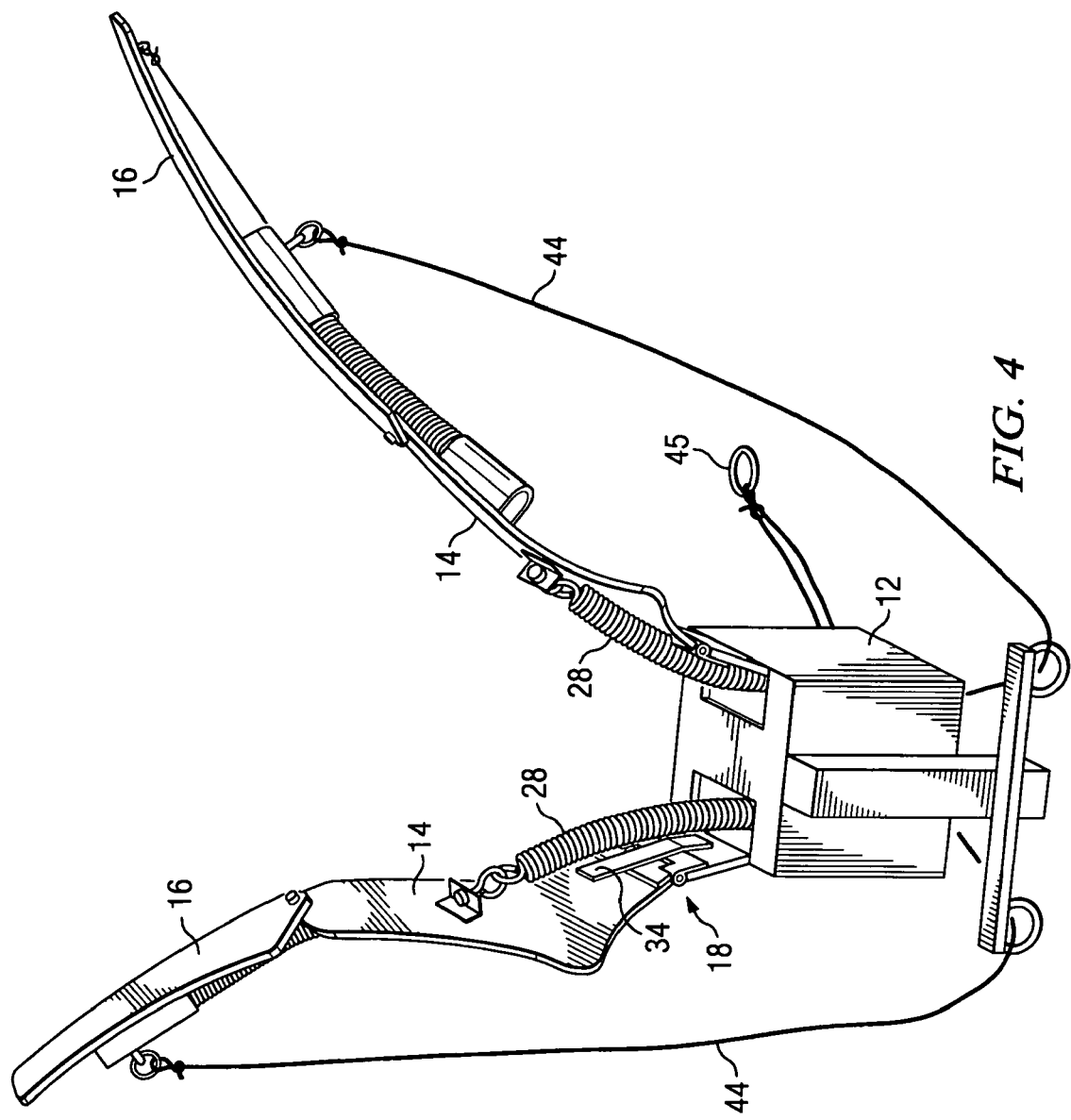
FIG. 4 is a rear perspective view of the wing structure of FIG. 2.

FIGS. 2 and 4 depict a wing structure 10 where the proximal wing member 14 and distal wing member 16 are fully extended in an upper position, mimicking a waterfowl in flight at the time of the commencement of a flap downstroke. As is best shown in FIG. 4, the proximal wing member 14 may be biased away from the base 12 with tension applied by a shoulder spring 28. Although depicted in the figures herein as a coil spring, the shoulder spring 28 may be implemented as a leaf spring, elastic band, or other device suitable to bias the proximal wing member 14 away from the base 12. As is best shown in FIG. 3, the range of tension applied by the shoulder spring 28 across the shoulder connection 18 may be made adjustable. Adjustment can be accomplished by tightening turnbuckle bolts 30A, 30B attached to each end of the shoulder spring 28 and received in brackets 32A, 32B, with one bracket 32A being operatively associated with the proximal wing member 14 and the other bracket 32B being operatively associated with either the attachment plate 20 or the base 12. Also shown in FIG. 3 is a limiting plate 34 operatively associated with the attachment plate 20 or the base 12 and spanning the shoulder connection 18. The limiting plate 34 serves to limit the range of upward motion which the proximal wing member 14 can traverse with respect to the base 12. Although shown as a separate structure in FIG. 3, the limiting plate 34 could be implemented as a cable on the underside of the shoulder connection 18 or be machined as a positive rotational stop into the shoulder connection 18 itself.

Figure 5:
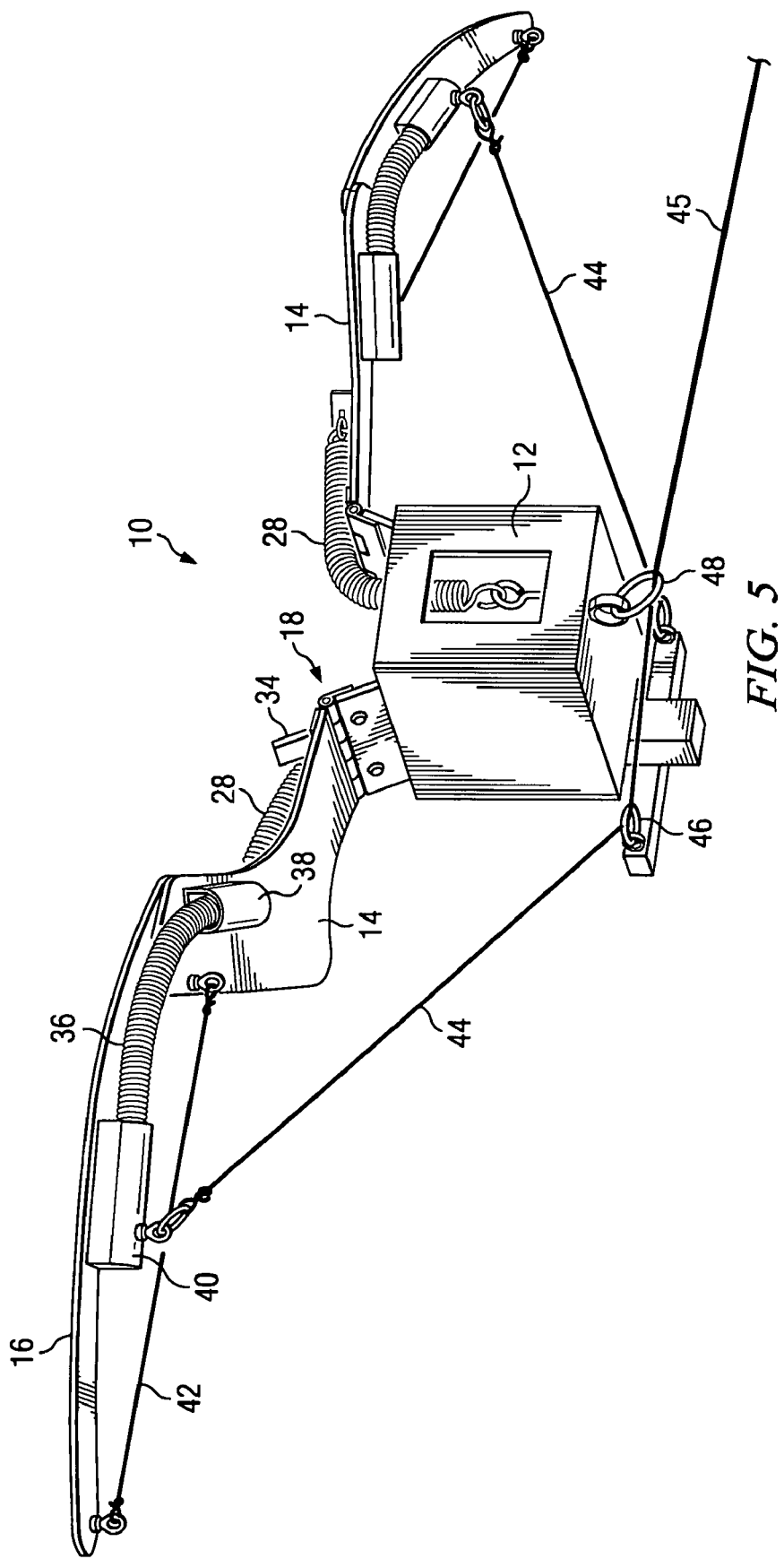
FIG. 5 is a perspective view of the wing structure of FIG. 2 showing the wings as positioned at the end of a downstroke.

FIG. 5 shows a wing structure 10 featuring left and right proximal supports 14 attached to a base 12 which proximal supports 14 have been articulated through a downstroke. As is shown in FIG. 5, the shoulder spring 28 is extended and applying tension to the proximal wing member 14. This tension may provide the force necessary to cause a simulated recovery stroke.

Returning to FIG. 2, a wrist spring 36 is shown spanning the leading edge of the wrist connection 24. The wrist spring 36 may be configured to bias a portion of the distal wing member 16, which is substantially opposite the wrist connection 24, away from the proximal wing member 14. The wrist spring 36 may be connected to the proximal wing member 14 by a proximal anchor 38 and a distal anchor 40. Although shown as a flexed coil spring in the accompanying figures, the wrist spring 36 may be implemented with a leaf spring, an elastic band, or other suitable tensioning device configured to bias the distal wing member 16 with respect to the proximal wing member 14. Also shown in FIGS. 2 and 3 is a limiting wire 42 which limits the forward range of motion of the distal wing member 16 with respect to the proximal wing member 14. Although the embodiment shown in the figures uses a limiting wire 42 to limit the forward range of motion of the distal wing member 16, this function could also be accomplished with a separate plate or a mechanical stop associated with the wrist connection 24, or machined directly into the wrist connection 24.

The embodiment shown in FIGS. 2–6 uses a shoulder spring 28 to bias the proximal wing member 14 away from the base 12. Similarly, the embodiment depicted in these figures uses a wrist spring 36 to bias a portion of the distal wing member 16 which is substantially opposite the wrist connection 24 away from the proximal wing member 14. In an alternative embodiment, wrist and shoulder springs or other biasing mechanisms could be used to bias the proximal wing member 14 toward the base 12, or bias a portion of the distal wing member 16 which is substantially opposite the wrist connection 24 toward the proximal wing member 14. Such reverse biased embodiments do not depart from the scope of the present invention.

Returning to FIGS. 2 and 5, a first actuation cable 44 is shown which is operatively associated with either the proximal wing member 14 or the distal wing member 16 and the base 12. Certain advantages are achieved if the first actuation cable 44 is operatively associated with the distal wing member 16 as described below and shown in FIGS. 2 and 5. In one embodiment, the first actuation cable 44 is attached to the distal wing member 16 in the area of the distal anchor 40, and subsequently threaded through a rear guide 46 and front guide 48. This embodiment is shown in FIGS. 2 and 5. An alternative embodiment which may provide a mechanical advantage when the wings are folded as described below includes a third proximal wing guide 47 positioned on the proximal wing member 14 as shown in FIG. 7. Although shown as simple rings in FIGS. 2 and 5, the rear guide 46 and front guide 48 may be implemented as sleeves, bearings, channels, or other structures suitable for supporting and guiding an actuation cable.

As is most clearly shown in FIG. 5, the application of tension to a portion of the first actuation cable 44 which is opposite the attachment of the first actuation cable 44 to the distal wing member 16 or proximal wing member 14 will draw the proximal wing member 14 toward the base 12 in a simulated downstroke flapping motion. The portion of the first actuation cable 44 to which tension is thus applied is defined herein as the tension point 45. The application of tension to the tension point 45 biases the shoulder spring 28 such that the rhythmic application and release of tension to the first actuation cable 44 at the tension point 45 can cause the proximal wing member 14 and distal wing member 16 of the wing structure 10 to flap through a simulated downstroke and recovery stroke. As discussed above, the furthest extent of the recovery stroke is set by the limiting plate 34, whereas the furthest extent of the downstroke is discretionary based upon the linear range over which tension is applied to the tension point 45.

In embodiments where two wings are simulated such as is shown in FIG. 5, first and second actuation cables 44 may be associated with each proximal wing member 14 or distal wing member 16 and suitable rear guides 46, proximal wing guides 47, and front guides 48 associated with the base 12. In a two winged embodiment, the first and second actuation cables 44 may be joined at or near the tension point 45 such that tension may be applied to the first and second actuation cables 44 simultaneously.

It is important to note that the application of tension to the tension point 45 which results in movement of the proximal wing member 14 toward the base 12 should not cause substantial articulation of the wrist connection 24 during the range of motion which simulates a downstroke and recovery stroke as shown in FIGS. 2 and 5. Thus, the full range of flapping motion which, in a natural bird, does not involve significant flexure at the wrist joint is effectively mimicked.

Preferably, continued application of tension to the tension point 45 beyond that necessary to simulate a wing downstroke will result in further movement of the proximal wing member 14 toward the base 12. Thus, further application of tension to the actuation cable 44 can cause the proximal wing member 14 to fold downward against the body of an associated decoy 11, simulating the position of natural waterfowl forewings at rest. In the full downward flexed position, the proximal wing member 14 is held adjacent to the body of the associated decoy 11 and can move no farther toward the base 12. If the actuation cable 44 is attached to the distal wing member 16 as is shown in FIGS. 2 and 5, however, further tension may be applied to the actuation cable 44, resulting in flexing at the wrist connection 24, causing a portion of the distal wing member 16 which is substantially opposite the wrist connection 24 to move toward the proximal wing member 14. Thus, the decoy wingtips of or associated with the distal wing member 16 may be folded back against the body of the decoy 11 to more fully mimic a waterfowl at rest.

Figure 6:
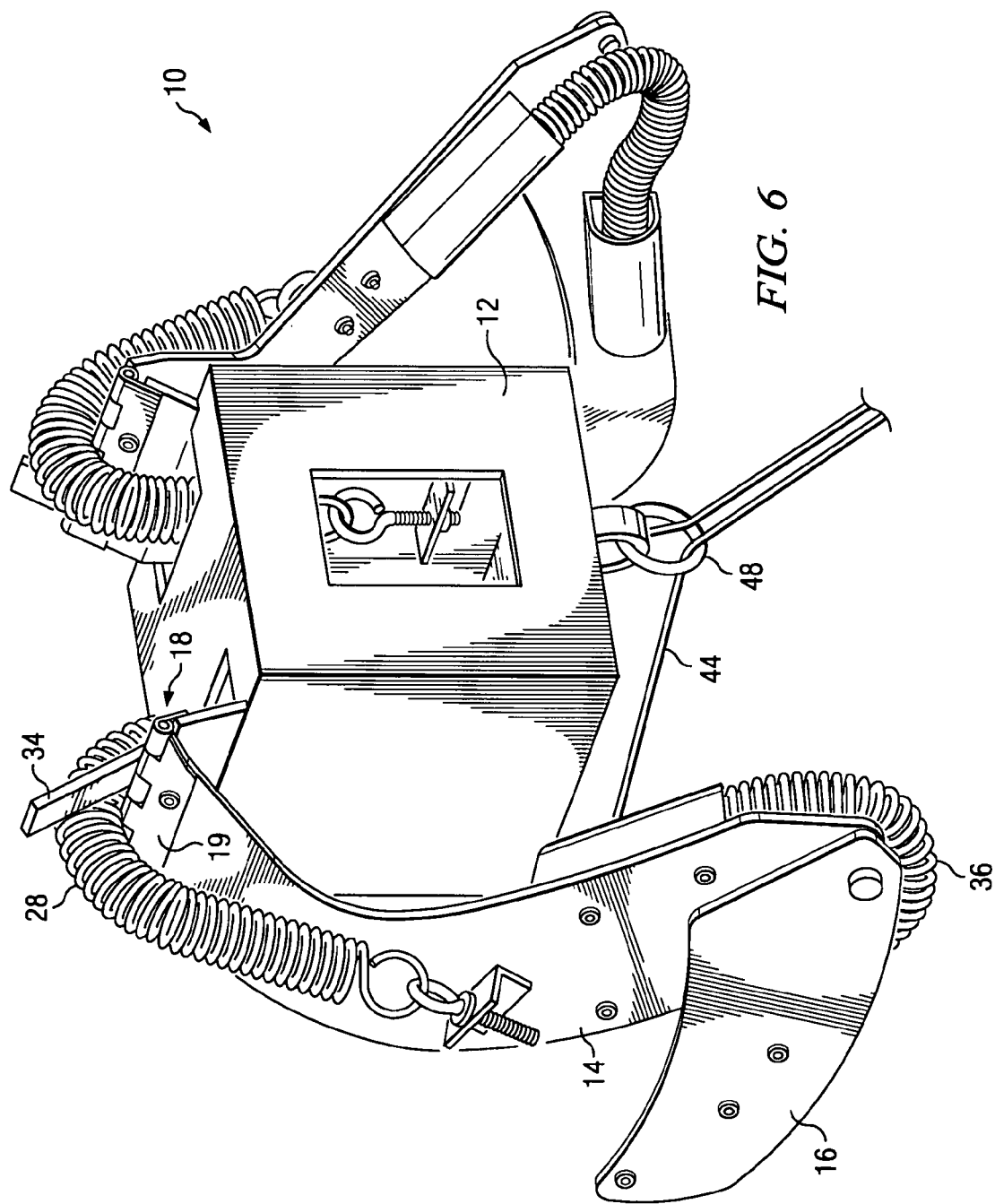
FIG. 6 is a perspective view of the wing structure of FIG. 2 showing the wings folded and retracted, mimicking a waterfowl at rest.

FIG. 6 illustrates the wing structure 10 when tension has been applied to the actuation cable 44 over a range exceeding that necessary to mimic flapping. The proximal wing member 14 is fully articulated toward the base 12 at the shoulder joint, and the shoulder spring 28 is fully biased. In addition, the portion of the distal wing member 16 opposite the proximal wing member 14 is articulated toward the proximal wing member 14, and the wrist spring 36 is fully biased. The geometry selected for the specific location of the front guide 48, proximal wing guide 47, rear guide 46, shoulder connection 18, wrist connection 24, shoulder spring 28, and wrist spring 36 with respect to the actuation cable 44 thus allows the operator of a decoy associated with the wing structure 10 to selectively flap decoy wings through a simulated downstroke and recovery stroke which may be followed by the selective folding of the forewings and wingtips against the decoy body 52 with natural articulation at shoulder and wrist joints. Both types of natural wing motion may, therefore, be mimicked by applying tension to a single actuation cable 44 over a suitable range. In embodiments where a first and second actuation cable 44 are associated with left or right proximal and distal supports 14, 16, respectively, a master cable 50 may be operatively associated with both the left and right actuation cables 44 so that tension may be applied to both actuation cables 44 simultaneously.

FIGS. 7 and 8 illustrate a decoy 11 including a wing structure 10 as described above. FIG. 7 illustrates the proximal wing member 14 and distal wing member 16 of the wing structure 10 in a fully extended and upright position, mimicking the position at the end of a recovery stroke and the beginning of a downstroke. FIG. 8 illustrates the same embodiment in a fully downward articulated position, mimicking a waterfowl at rest. The decoy 11 may include any suitably sized, hollow decoy body which may receive the base 12 within the decoy 11, and also include suitable openings for the proximal wing members 14 at the shoulders of the decoy 11.

In use, the proximal wing member 14, distal wing member 16, and associated structures may be covered by a suitable wing covering 22. The wing covering 22 may be a natural bird wing or portions thereof. Alternatively, the wing covering 22 may be a simple imprinted sheath or molded structure which is suitably sized to mount over the proximal and distal supports 14, 16, respectively, and which, when viewed from above, mimics a natural waterfowl wing. The wing covering 22 must flex appropriately at the wrist connection 24 and shoulder connection 18, and preferably will fully cover components of the wing structure 10 visible outside of the decoy body 52 such as the shoulder spring 28 or wrist spring 36.

A decoy 11 employing the wing structure 10 may be mounted at or near ground level in suitable habitat for attracting waterfowl. When mounted at ground level, a hunter or photographer using the decoy may selectively apply and release tension to an actuation cable 44 or master cable 50 at the tension point 45, causing the wing structure 10 to flap its wings and fold its wings into a rest position in a natural fashion, thus mimicking a natural waterfowl transitioning between flight and rest.

As is discussed above, a goose, when landing, will flap its wings while in the air above the ground. The goose then more or less simultaneously descends to the ground while folding its wings. A novel telescoping support pole 54, as shown in FIGS. 9–11, allows the user of a decoy 11 featuring a wing structure 10 as described above to mimic this behavior. The use of a telescoping support pole 54 with a decoy 11 as described above will give the impression of a safe place for landing to an approaching flock of wild geese. A key feature of the telescoping support pole 54 is that no clearly artificial structures are visible above the decoy 11, which might frighten approaching geese.

One embodiment of the telescoping support pole 54 includes a partially hollow fixed rod 56 which has a pointed lower end 58, and which is suitable for being driven into the ground in a suitable waterfowl habitat. In addition, a movable rod 60 is operatively associated with the fixed rod 56 such that the movable rod 60 may move along its lengthwise axis with respect to the fixed rod 56. An embodiment where the movable rod 60 fits and slides in a telescoping fashion within the fixed rod 56 is one possible operative orientation. In particular, the movable rod 60 may be received in an opening 62 into a hollow channel 64 of the fixed rod 56, which opening 62 is positioned opposite the pointed end 58 of the fixed rod 56. An external diameter of the movable rod 60 may be selected such that the movable rod 60 slides easily within the hollow channel 64 of the fixed rod 56, and the movable rod 60 may thus be telescoped up and down with respect to the position of the fixed rod 56. FIGS. 9–10 depict the telescoping support pole 54 where the movable rod 60 is extended with respect to the fixed rod 56. On the contrary, FIG. 11 depicts the movable rod 60 telescoped into the fixed rod 56, thereby decreasing the overall length of the telescoping support pole 54.

The telescoping support pole 54 also includes an attachment structure 66 which is operatively associated with the movable rod 60 opposite the end where the movable rod 60 passes through the opening 62. The attachment structure 66 allows the selective engagement and disengagement of a decoy 11 or wing structure 10 as described above with the telescoping support pole 54. The attachment structure 66 may be as simple as a cotter pin or key, or may feature more sophisticated, quick release attachment mechanisms such as are commonly known in the mechanical arts. FIG. 9 shows a decoy 11 attached in an operative configuration to the movable rod 60 by the attachment structure 66.

Certain advantages are achieved if the fixed rod 56 and the movable rod 60 have a noncircular cross section. Any noncircular cross section is suitable, for example, the telescoping support pole 54 may be implemented with a fixed rod 56 and movable rod 60, each having a square, triangular, or other polygonal cross section. The noncircular cross section prevents the movable rod 60 and any decoy 11 attached thereto from spinning, wobbling, or rotating while the telescoping support pole 54 is being used and actuated.

As is shown in FIG. 10, a bearing 68, which may be a roller bearing or other type of lubricated sleeve, may be operatively associated with the opening 62 to facilitate the telescoping motion of the movable rod 60 with respect to the fixed rod 56.

It is preferable that the pointed end 58 of the fixed rod 56 be a solid member without any opening to the hollow channel 64. A closed pointed end 58 will prevent dirt, soil, or mud from being forced into the hollow channel 64, which would interfere with the telescoping action of the movable rod 60 with respect to the fixed rod 56. The pointed end 58 may be machined directly into a nonchannelled portion of the fixed rod 56, or may be a supplemental structure affixed to the end of the fixed rod 56.

The movable rod 60 may be raised or lowered with respect to the fixed rod 56 in a telescoping fashion by any number of means. In one embodiment, an elevation cable 70 is attached to the lower end of the movable rod 56 opposite the attachment structure 66. The elevation cable 70 may be fed over a pulley 72 positioned near the opening 62 and any bearing 68 associated therewith. Tension applied to the elevation cable 70 thus serves to draw the end of the movable rod 60 opposite the attachment structure 66 toward the opening 62, effectively raising the movable rod 60 with respect to the fixed rod 56. A release of tension upon the elevation cable 70 allows the movable rod 60 to descend into the hollow channel 64 by gravity. Certain advantages are achieved if the elevation cable 70 runs from the pulley 72 associated with the opening 62 to a second pulley 74 positioned on the exterior of the fixed rod 56 near ground level. This configuration reduces the moment arm of torque applied to the entire telescoping support pole 54 when tension is applied to the elevation cable 70, thus reducing the risk that the telescoping support pole 54 and attached decoy 11 would be tipped or wobbled when the telescoping support pole 54 is actuated.

In the embodiment described above, it is advisable that a slot 76 be formed in the movable rod 60, as shown in FIG. 9, to provide clearance for the elevation cable 70 and pulley 72 when gravity draws the movable pole 60 into the hollow channel 64 of the fixed rod 56.

The description of the elevation cable 70 and pulleys 72, 74 described above are not intended to be limiting. Any suitable means of moving the movable rod 60 with respect to the fixed rod 56 along the rods' 56, 60 respective lengthwise axes are suitable for implementation of this aspect of the present invention.

In use, the hunter or photographer may apply tension to the elevation cable 70, thus extending the movable rod 60 with respect to the fixed rod 56 and raising an associated decoy 11 with respect to the ground. Simultaneously, the hunter or photographer may articulate a flapping mechanism as described above, producing the impression of takeoff and flight. By releasing tension on the elevation cable 70, the decoy 11 will lower as gravity causes the movable rod 60 to telescope within the fixed rod 56, thus creating the impression of a decoy 11 landing. Meanwhile the operator may still be flapping the decoy 11 wings. Subsequently, when the decoy 11 has descended to the limits of the telescoping support pole 54, the decoy 11 wings may be folded to mimic a bird at rest as described above. By reversing and repeating these actions, a decoy 11 can be made to both rise and settle, mimicking flying and landing in a natural manner.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

The invention claimed is:

1. A wing structure for a waterfowl decoy comprising:
   a base;
   a proximal wing member;
   a distal wing member;
   a shoulder connection between the base and the proximal wing member allowing the proximal wing member to move with respect to be base, the shoulder connection being a hinge;
   a shoulder spring which biases the proximal wing member away from the base, the shoulder spring extending between the base and the proximal wing member;
   a wrist connection between the proximal wing member and the distal wing member allowing the distal wing member to move with respect to the proximal wing member, the wrist connection being a pivot which extends transversely through both the proximal wing member and the distal wing member;
   a wrist spring which biases a portion of the distal wing member which is substantially opposite the wrist connection away from the proximal wing member, the wrist spring extending between the proximal wing member and the distal wing member; and
   an actuation cable configured to move the proximal wing member toward the base upon the application of tension to the actuation cable with movement occurring at the shoulder connection, the actuation cable being further configured to move a portion of the distal wing member which is substantially opposite the wrist connection toward the proximal wing member upon the application of additional tension to the actuation cable with movement occurring at the wrist connection, the actuation cable having a first end attached to the distal wing member.

2. The wing structure of claim 1 further comprising a decoy body operatively associated with the base.

3. The wing structure of claim 1 further comprising a wing covering supported by the proximal wing member and the distal wing member.

4. A waterfowl decoy comprising:
   a decoy body;
   a first shoulder connection between a first proximal wing member and the decoy body allowing the first proximal wing member to move with respect to the decoy body, the first shoulder connection comprising a first hinge and a first shoulder spring which biases the first proximal wing member away from the decoy body, the first shoulder spring extending between the decoy body and the first proximal wing member;
   a first wrist connection between a first distal wing member and the first proximal wing member allowing the first distal wing member to move with respect to the first proximal wing member, the first wrist connection comprising a pivot which extends transversely through both the first proximal wing member and the first distal wing member and a wrist spring which biases a portion of the first distal wing member which is substantially opposite the first wrist connection away from the first proximal wing member, the first wrist spring extending between the first proximal wing member and the first distal wing member; and a first actuation cable configured to move the first proximal wing member toward the decoy body upon the application of tension to the first actuation cable with movement occurring at the first shoulder connection, the first actuation cable being further configured to move a portion of the first distal wing member which is substantially opposite the first wrist connection toward the first proximal wing member upon the application of additional tension to the first actuation cable with movement occurring at the first wrist connection, the first actuation cable having a first end attached to the first distal wing member.

5. The waterfowl decoy of claim 4 further comprising:

a second shoulder connection operatively associated with a second proximal wing member and the decoy body;

a second wrist connection operatively associated with a second distal wing member and the second proximal wing member; and a second actuation cable configured to move the second proximal wing member toward the decoy body upon the application of tension to the second actuation cable with movement occurring at the second shoulder connection, the second actuation cable being further configured to move a portion of the second distal wing member which is substantially opposite the second wrist connection toward the second proximal wing member upon the application of additional tension to the second actuation cable with movement occurring at the second wrist connection.

6. The waterfowl decoy of claim 5 further comprising a master cable operatively associated with the first actuation cable and the second actuation cable whereby tension applied to the master cable is transmitted to both the first actuation cable and the second actuation cable.

7. The waterfowl decoy of claim 4 further comprising a mounting pole operatively associated with the decoy body supporting the decoy body above ground level.

8. The waterfowl decoy of claim 7 further comprising:

an elevation cable operatively associated with the decoy, whereby application of tension to the elevation cable changes the height the decoy is supported above the ground.

* * * * *